US009942854B2

(12) United States Patent
Kapoor et al.

(10) Patent No.: US 9,942,854 B2
(45) Date of Patent: Apr. 10, 2018

(54) ADAPTIVE SLEEP DELAY

(71) Applicant: Apple Inc., Cupertino, CA (US)

(72) Inventors: Gaurav Kapoor, Santa Clara, CA (US); Andrei Dorofeev, San Jose, CA (US); Varaprasad V. Lingutla, Cupertino, CA (US); Cyril de la Cropte de Chanterac, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 194 days.

(21) Appl. No.: 14/846,678

(22) Filed: Sep. 4, 2015

(65) Prior Publication Data
US 2016/0360488 A1 Dec. 8, 2016

Related U.S. Application Data

(60) Provisional application No. 62/171,666, filed on Jun. 5, 2015.

(51) Int. Cl.
*G08C 17/00* (2006.01)
*H04B 1/38* (2015.01)
*H04W 52/02* (2009.01)

(52) U.S. Cl.
CPC ... *H04W 52/0264* (2013.01); *H04W 52/0251* (2013.01); *H04W 52/0254* (2013.01); *Y02B 60/50* (2013.01)

(58) Field of Classification Search
CPC ......... H04W 52/0264; H04W 52/0254; H04W 52/0251; Y02B 60/50
See application file for complete search history.

(56) References Cited

U.S. PATENT DOCUMENTS

| | | |
|---|---|---|
| 6,516,421 B1 | 2/2003 | Peters |
| 7,330,740 B2 | 2/2008 | Bennett et al. |
| 7,683,578 B2 | 3/2010 | Wang et al. |
| 7,912,517 B2 | 3/2011 | Park |
| 7,941,180 B2 | 5/2011 | Karaoguz et al. |
| 8,489,150 B2 | 7/2013 | Lee et al. |
| 8,654,078 B2 | 2/2014 | Lee et al. |
| 2006/0132060 A1 | 6/2006 | Chen |

(Continued)

OTHER PUBLICATIONS

'JuiceDefender' [online]. "JuiceDefender Manual" Date: Prior to 2015, 19 pages http://www.juicedefender.com/reference/.

(Continued)

*Primary Examiner* — Kiet Tang
(74) *Attorney, Agent, or Firm* — Fish & Richardson P.C.

(57) ABSTRACT

An example computer-implemented method includes determining, by an electronic device, that the electronic device has not received a user activity for an interval of time. The method also includes determining, by the electronic device, a contextual state of the electronic device, and adapting, by the electronic device, a sleep delay value based on the determined contextual state of the electronic device. The method also includes determining that the interval of time has exceeded the sleep delay value, and responsive to determining that the interval of time has exceeded the sleep delay value, transitioning, by the electronic device, from a first power state to a second power state, where the first power state is higher or lower than the second power state.

44 Claims, 4 Drawing Sheets

(56) References Cited

U.S. PATENT DOCUMENTS

| | | | |
|---|---|---|---|
| 2007/0298847 A1* | 12/2007 | Karaoguz | H04B 1/1615 |
| | | | 455/572 |
| 2010/0174501 A1 | 7/2010 | Myadam | |
| 2012/0064948 A1* | 3/2012 | Lee | H04M 1/67 |
| | | | 455/566 |
| 2012/0137217 A1 | 5/2012 | Amsterdam et al. | |
| 2012/0210325 A1 | 8/2012 | de Lind van Wijngaarden et al. | |
| 2012/0324578 A1 | 12/2012 | Seinfeld et al. | |
| 2014/0075220 A1 | 3/2014 | Song | |

OTHER PUBLICATIONS

Mac OS X: The Missing Manual, Tiger Edition: The Missing Manual, David Pogue, 2005, pp. 285-288.

Mediati, "How to set up battery saver mode on Android 5.0 Lollipop," Greenbot, Dec. 5, 2014, 4 pages http://www.greenbot.com/article/2855011/how-to-set-up-battery-saver-mode-on-android-50-lollipop.html.

* cited by examiner

ADAPTIVE SLEEP DELAY

CROSS-REFERENCE TO RELATED APPLICATION

This application claims priority to U.S. Provisional Application No. 62/171,666, filed on Jun. 5, 2015. The disclosure of the prior application is considered part of and is incorporated by reference in the disclosure of this application.

TECHNICAL FIELD

This disclosure relates to dynamically adjusting a sleep delay time value on an electronic device.

BACKGROUND

Electronic devices can often operate according to multiple different power states to vary the amount of power consumed during operation. In some cases, an electronic device can disable or otherwise modify the operation of one or more components to reduce the amount of power that is drawn. Some electronic devices transition to low power states when no user activity is detected. In some cases, however, it may be undesirable to perform the power transition even when there is no user activity as doing so may disrupt an important task.

SUMMARY

In general, in an aspect, a computer-implemented method includes determining, by an electronic device, that the electronic device has not received a user activity for an interval of time. The method also includes determining, by the electronic device, a contextual state of the electronic device, and adapting, by the electronic device, a sleep delay value based on the determined contextual state of the electronic device. The method also includes determining that the interval of time has exceeded the sleep delay value, and responsive to determining that the interval of time has exceeded the sleep delay value, transitioning, by the electronic device, from a first power state to a second power state, where the first power state is higher or lower than the second power state.

In general, in another aspect, a non-transitory computer-readable medium includes one or more sequences of instructions which, when executed by one or more processors, causes determining, by an electronic device, that the electronic device has not received a user activity for an interval of time. The instructions also cause determining, by the electronic device, a contextual state of the electronic device, and adapting, by the electronic device, a sleep delay value based on the determined contextual state of the electronic device. The instructions also cause determining that the interval of time has exceeded the sleep delay value, and responsive to determining that the interval of time has exceeded the sleep delay value, transitioning, by the electronic device, from a first power state to a second power state, where the first power state is higher or lower than the second power state.

In general, in another aspect, a system includes one or more processors, and a non-transitory computer-readable medium including one or more sequences of instructions. The instructions, when executed by the one or more processes, cause determining, by an electronic device, that the electronic device has not received a user activity for an interval of time. The instructions also cause determining, by the electronic device, a contextual state of the electronic device, and adapting, by the electronic device, a sleep delay value based on the determined contextual state of the electronic device. The instructions also cause determining that the interval of time has exceeded the sleep delay value, and responsive to determining that the interval of time has exceeded the sleep delay value, transitioning, by the electronic device, from a first power state to a second power state, where the first power state is higher or lower than the second power state.

Implementations of these aspects may include or more of the following features.

In some implementations, adapting the sleep delay value can include obtaining a default time value, and modifying the default time value based on the contextual state of the electronic device. Modifying the default time value can include determining a modifier value associated with the contextual state of the electronic device, and modifying the default time value by the modifier value.

In some implementations, adapting the sleep delay value can include determining a time value associated with the contextual state of the electronic device, and determining that the sleep delay value is equal to the time value associated with the contextual state of the electronic device.

In some implementations, the contextual state of the electronic device can correspond to a trigger event that occurred while the electronic device was last in the low power state.

In some implementations, the contextual state of the electronic device can correspond to a motion state of the electronic device.

In some implementations, the contextual state of the electronic device can correspond to an orientation of the electronic device.

In some implementations, the contextual state of the electronic device can correspond to a state of a battery of the electronic device.

In some implementations, the contextual state of the electronic device can correspond to a state of an application running on the electronic device.

In some implementations, the contextual state of the electronic device can correspond to a state of a network connection of the electronic device.

In some implementations, the contextual state of the electronic device can correspond to a security state of the electronic device.

In some implementations, the contextual state of the electronic device can correspond to recent user behavior detected by the electronic device.

In some implementations, transitioning from the first power state to the second power state can include shutting off a display device of the electronic device.

In some implementations, transitioning from the first power state to the second power state can include reducing a processing capability of a processor of the electronic device.

One or more of the following advantages can be realized by an adaptive sleep delay. In some cases, the sleep delay of an electronic device can be adaptively adjusted depending on the contextual state of the electronic device. In doing so, the electronic device can adaptively adjust its power consumption in response to the operating conditions of the electronic device, while also reducing the likelihood that it will transition between power states while a user is still using the device. As a result, the electronic device can more efficiently consume power in a manner that is less likely to inconvenience the user.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Overview

Figure 1:
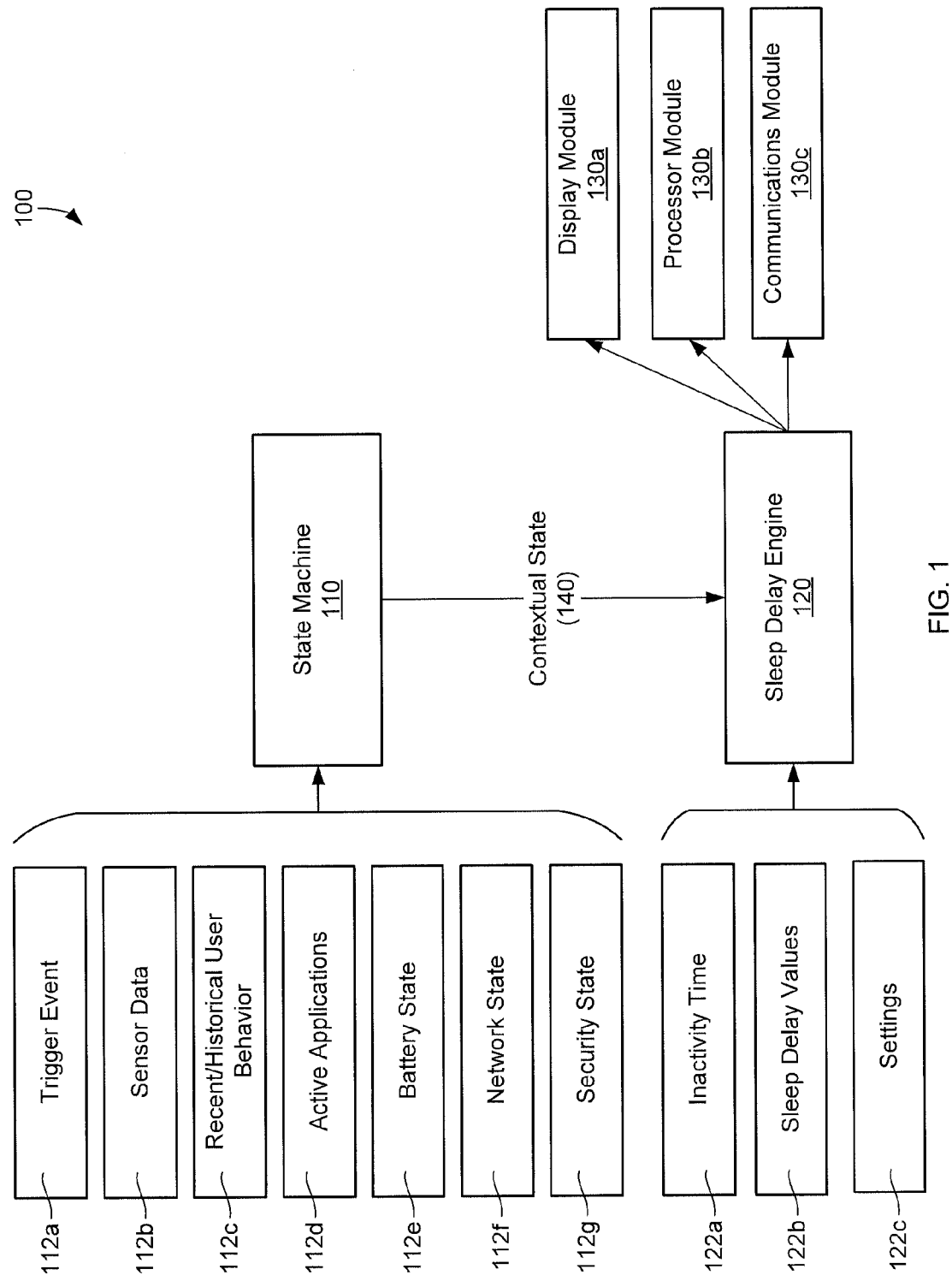
FIG. 1 is a diagram of an example system for adaptively adjusting a sleep delay of an electronic device.

Mobile electronic devices, such as cellular phones (e.g., smartphones or feature phones), tablet computers, media players, and computers (e.g., notebook computers, and wearable computers), can often operate according to multiple different power states to vary the amount of power that they consume during operation. As an example, an electronic device can operate according to a relatively high power state (e.g., a "wake" state). In this power state, the device can draw a relatively large amount of power and can provide a relatively broad range of functionality. However, to conserve power, the electronic device can transition into a low power state (e.g., a "sleep" state). In this power state, the device can draw comparatively less power, but as a trade-off, can provide a comparatively limited range of functionality.

As an example, while in a high power state, an electronic device can enable a display device (e.g., a display screen), such that information is visually displayed to a user. As another example, an electronic device can also visually present information using one or more visual effects (e.g., by blurring one or more visual elements using a blur filter, animating one or more visual elements, and so forth). As another example, an electronic device can operate one or more processing units (e.g., computer processing units—CPUs, graphics processing units—GPUs, or other processing units) in an increased capability mode (e.g., by operating the processing units according to a relatively high clock speed or by enabling one or more cores of the processing units). As another example, an electronic device can also enable particular functions of the electronic device. For instance, an electronic device can activate network connectivity, such that the electronic device can transmit and receive data from a communications network. As yet another example, an electronic device can also retrieve data from the network relatively frequently, or allow data to be "pushed" to it from a remote server.

To conserve power, the electronic device can transition from the high power state to a low power state. As an example, in transitioning to a low power state, an electronic device can reduce the brightness of a display screen (e.g., by reducing the brightness of a backlight) or disable the display screen entirely, such that information is no longer visually displayed to a user. As another example, an electronic device can reduce the visual effects that are applied when presenting information (e.g., by limiting or eliminating the use of blurring effects or animations). As another example, an electronic device can operate one or more processing units according to a reduced capability mode (e.g., by operating the processing units according to a relatively low clock speed or by disabling one or more cores of the processing units). As another example, an electronic device can also reduce, or in some cases disable, particular functions of the electronic device. For instance, an electronic device can retrieve data from a network relatively infrequently, or prevent data from being "pushed" to it from a remote server. As yet another example, an electronic device can change the operation of a communications module (e.g., a cellular radio, Wi-Fi radio, or other wireless radio) to consume less power. For instance, an electronic device can instruct a cellular radio to disable or limit certain features, such as multiple-input and multiple-output (MIMO) functions. As yet another example, an electronic device can disable its network connectivity entirely, such that the device cannot transmit and receive data from the communications network. In some cases, an electronic device can perform a single power saving operation (e.g., disable a display screen) or perform multiple power saving operations (e.g., disable a display screen and operate its processing units according to a reduced clock speed).

The electronic device can transition between power states based on several different factors. For instance, in some cases, the electronic device can transition from a low power state to a high power state in response to the occurrence of a particular trigger event (e.g., receipt of a user command to transition to a high power state, receipt of an incoming communication to be displayed to a user, or any other trigger event). The electronic device can subsequently transition back to the low power state after a particular period of inactivity by the user. This interval of time is often referred to as a "sleep delay."

As an example, a user can instruct the electronic device to transition from a low power state to a high power state. While the electronic device is in the high power state, a user can interact with the device (e.g., by inputting commands into the device) to perform various tasks. If the user discontinues use of the device, after a particular interval of time has elapsed since the user's last activity or command (e.g., after the sleep delay has elapsed), the electronic device can transition to a low power state to conserve power.

As another example, the electronic device can transition from a low power state to a high power state to display a notification message to a user. If the user does not interact with the electronic device, after a particular interval of time has elapsed since the electronic device transitioned to the high power state (e.g., after the sleep delay has elapsed), the electronic device can transition to a low power state to conserve power.

In some cases, the sleep delay of an electronic device can be a static interval of time. For example, in some implementations, an electronic device can transition from a high power state to a low power state when a user has not interacted with the device (e.g., has not inputted any commands into the device) for a particular period of time (e.g., one second, two seconds, three seconds, or any other interval of time).

In some cases, the sleep delay of an electronic device can be adaptively adjusted depending on the contextual state of the electronic device. The contextual state of the electronic device can be determined based on several factors, including the historical operating conditions of the electronic device, the present operating conditions of the electronic device, and/or the anticipated operating conditions of the electronic device. By adaptively adjusting the sleep delay based on the contextual state of the electronic device, the electronic device can adaptively adjust its power consumption in response to the operating conditions of the electronic device, while also reducing the likelihood that it will transition between power states while a user is still using the device. As a result, the electronic device can more efficiently consume power in a manner that is less likely to inconvenience the user.

Example System

FIG. 1 is a diagram of an example of a system 100 for adaptively adjusting a sleep delay of an electronic device. The system 100 includes a state machine 110 and a sleep delay engine 120. In some implementations, the system 100 can be implemented as a part of an electronic device to control the operation of one or more modules 130 of the electronic device. For example, state machine 110 can be implanted in software/firmware, hardware or a combination of software/firmware and hardware.

The state machine 110 (e.g., an event driven finite state machine) determines the contextual state 140 of the electronic device based on various input information 112. Input information 112 can include information regarding the historical or previous contextual state of the electronic device (e.g., operating conditions of the electronic device) or the state of an application or operating system running on a processor of the electronic device, the present contextual state of the electronic device, and/or the anticipated contextual state of the electronic device. As illustrative examples, input information 112a-g are shown in FIG. 1.

In some cases, the state machine 110 can determine the contextual state of an electronic device based, at least in part, on input information 112a pertaining to trigger events that have occurred on the electronic device and memory of one or more previous contextual states of the electronic device. Trigger events can be, for example, events that occurred on the electronic device that caused the electronic device to transition from a low power state (e.g., a "sleep" state) to a high power state (e.g., an "awake" state). For example, a trigger event can include the receipt of an incoming communication (e.g., a telephone call, a short message service (SMS) message, an e-mail, an instant message, or any other type of communication). As another example, a trigger event can include the receipt of a notification, an alert, or an alarm generated by an application running on the electronic device. The state machine 110 can determine a contextual state based, at least in part, on the input information 112a and memory of one or more previous contextual states. For example, in some cases, using the input information 112a, the state machine 110 can determine the type of trigger event that had occurred, and can determine the contextual state of the electronic device based on this determination. In some implementations, the electronic device can be in a first state and then transition to a second state based on a combination of the first state and the input information 112a.

In some cases, the state machine 110 can determine the contextual state of an electronic device based, at least in part, on input information 112b pertaining to sensor data obtained from sensors on the electronic device. As an example, an electronic device can include one or more proximity sensors (e.g., electromagnetic field or beam sensors, such as infrared sensors) that determine whether the electronic device is in proximity to an object. As another example, an electronic device can include one or more motion sensors (e.g., accelerometers or gyroscopes) that determine whether the electronic device is in motion. As another example, an electronic device can include one or more orientation sensors (e.g., accelerometers or compasses) that determine the orientation of the electronic device. As yet another example, the electronic device can include one or more light sensors (e.g., photoelectric sensors) that determine the amount of light that is incident on the electronic device. The state machine 110 can determine a contextual state based, at least in part, on the input information 112b. For example, in some cases, using the input information 112b, the state machine 110 can determine characteristics of the environment surrounding the electronic device (e.g., the amount of ambient light that is present in the surrounding environment) and the electronic device's disposition within that environment (e.g., the physical orientation of the electronic device and its proximity to surrounding objects), and can determine the contextual state of the electronic device based on this determination. In some implementations, the electronic device can include one or more biometric sensors that identify the user, for example, through fingerprint identification. In some implementations, the electronic device includes a health monitor that uses biometric sensors that measure the heart rate and other vital signs of the user.

In some cases, the state machine 110 can determine the contextual state of an electronic device based, at least in part, on input information 112c pertaining to recent and/or historical behavior of a user interacting with the electronic device. As an example, input information 112c can include information regarding the type of commands that were recently entered by the user (e.g., which buttons the user pressed and when those buttons were pressed, which inputs the user made on a touch-sensitive display and when those inputs were made, and so forth). As another example, input information 112c can include information regarding the type of commands that were historically entered by the user (e.g., which commands were entered by the user in response to the occurrence of particular trigger events, which commands were entered during particular times of days and/or days of the week, and so forth). The state machine 110 can determine a contextual state based, at least in part, on the input information 112c. For example, in some cases, using the input information 112c, the state machine 110 can determine how the user has been recently and historically utilizing the electronic device, and can determine the contextual state of the electronic device based on this determination.

In some cases, the state machine 110 can determine the contextual state of an electronic device based, at least in part, on input information 112d pertaining to the active applications that are running on the electronic device. As an example, input information 112d can include information regarding the number of applications that are active on the electronic device. As another example, information 112d can include information regarding the identity of the applications that are active on the electronic device (e.g., a process name, a process identification, or other identifying information). As another example, input information 112d can include information regarding the processing priority of the applications that are active on the electronic device. For instance, the input information 112d can include information regarding whether an active application has been assigned a particular priority (e.g., "high," "medium," or "low") designating the application's relative priority to the processing resources of the electronic device. In some cases, the input information 112d can include information regarding the application that is at the foreground of a user interface of the electronic device (e.g., the application that is being "focused" on by the user). In some cases, the input information 112d can include information regarding whether a user-initiated application is at the foreground of a user interface of the electronic device, or whether an application launcher interface (e.g., a "home screen," "springboard" or "launcher" interface) is at the foreground of the user interface. In some cases, the input information 112d can include information regarding the active application that was most recently used by the user. The state machine 110 can determine a contextual state based, at least in part, on the information 112d. For example, in some cases, using the input information 112d, the state machine 110 can determine the number, identity, and priority of any application that is actively running on the electronic device, and can determine the contextual state of the electronic device based on this determination.

In some cases, the state machine 110 can determine the contextual state of an electronic device based, at least in part, on input information 112e pertaining to the battery state of the electronic device. As an example, input information 112e can include information regarding the battery capacity of the electronic device (e.g., the amount of electric power that the battery can hold when fully charged), the amount of power that currently remains in the battery (e.g., the amount of electric power that is available for use by the electronic device), and the rate of discharge of the battery (e.g., the rate at which electric power is being depleted from the battery). As another example, input information 112e can include information regarding whether the electronic device is coupled to an external power source (e.g., plugged into an electrical socket, external battery device, or other charging device) and the rate at which the battery is being recharged. The state machine 110 can determine a contextual state based, at least in part, on the input information 112e. For example, in some cases, using the input information 112e, the state machine 110 can determine the power consumption characteristics of the electronic device, and can determine the contextual state of the electronic device based on this determination.

In some cases, the state machine 110 can determine the contextual state of an electronic device based, at least in part, on input information 112f pertaining to the network state of the electronic device. As an example, input information 112f can include information regarding the communications networks to which the electronic device is connected (e.g., the number of networks, and the communications protocols or communications standards according to which those networks operate). As another example, input information 112f can include information regarding the information that is being transmitted to and from those networks (e.g., the rate at which information is being transmitted and received, the frequency by which the information is being transmitted and received, the type of information that is being transmitted and received, and so forth). The state machine 110 can determine a contextual state based, at least in part, on the input information 112f. For example, in some cases, using the input information 112f, the state machine 110 can determine the networks to which the electronic device is connected, the type of information that is being transmitted and received, and the frequency by which that information is being transmitted and received, and can determine the contextual state of the electronic device based on this determination.

In some cases, the state machine 110 can determine the contextual state of an electronic device based, at least in part, on input information 112g pertaining to the security state of the electronic device. As an example, input information 112g can include information regarding whether the electronic device has engaged a security lock (e.g., a "lock screen") that restricts access to the electronic device until an authorized user has been authenticated (e.g., through entry of login credentials, such as a user name and/or passphrase). As another example, input information 112g can include information regarding whether the electronic device has engaged a reduced functionality mode that reduces the functionality of the electronic device (e.g., a "child" or "kiosk" mode that enables a user to access to only a limited set of applications) until an administrative user has been authenticated (e.g., through entry of login credentials). The state machine 110 can determine a contextual state based, at least in part, on the information 112g. For example, in some cases, using the input information 112g, the state machine 110 can determine whether the device is "locked" or in a reduced functionality mode, and can determine the contextual state of the electronic device based on this determination.

The state machine 110 determines the contextual state 140 based on some or all of the input information 112a-g, either individually or in combination. For instance, in some cases, the state machine 110 can determine that particular combinations or sub-combinations of input information 112a-g can correspond to one particular contextual state, while other particular combinations or sub-combinations of input information 112a-g can correspond to one or more other contextual states.

As an illustrative example, in some cases, the state machine 110 can determine that the electronic device is in an "in-use" contextual state based on certain combinations of input information 112c, 112f, and 112g. For instance, the state machine 110 can receive input information 112c indicating that the user has been recently interacting with a particular application in the foreground, input information 112f indicating that the electronic device is actively receiving information from a network, and input information 112g indicating that the electronic device is currently in an unlocked security state. Based at least in part on this combination of inputs, the electronic device can determine that the device is being actively used by the user.

As another example, in some cases, the state machine 110 can determine that the electronic device is in an "idle" contextual state based on certain other combinations of input information 112c, 112f, and 112g. For instance, the state machine 110 can receive input information 112c indicating that the user has recently exited from a particular application in the foreground and has not invoked another application to replace it, input information 112f indicating that the electronic device is not actively receiving information from a network, and input information 112g indicating that the electronic device is currently in a locked security state. Based at least in part on this combination of inputs, the electronic device can determine that the device is "idle," and is not being actively used by the user.

Although combinations of input information 112c, 112f, and 112g are described above, this is merely an illustrative example. In practice, any combination or sub-combination of input information 112a-g can be used to determine a contextual state of an electronic device.

As another illustrative example, the state machine 110 can determine that the electronic device is resting on an inanimate object (e.g., a table or desk) based on input information 112b indicating that the device is in a horizontal orientation (e.g., with its display screen facing upward or downward) and indicating that the device is not moving. Further, the state machine 110 can determine that the electronic device is being transported by a user (e.g., in the user's pocket) based on input information 112b indicating that the device is in a vertical orientation (e.g., with its display screen facing a horizontal direction) and indicating that the device is experiencing a relatively large degree of motion or a relatively large degree of variance in its motion (e.g., motion characteristic of a device being transported by a user who is walking or running). Further still, the state machine 110 can determine that the electronic device is in the user's hand based on input information 112b indicating that the device is in inclined orientation (e.g., with its display screen in an inclined angle with respect to the horizontal) and indicating that the device is experiencing a moderate degree of motion or a moderate degree of variance in its motion (e.g., motion characteristic of a device being manipulated while in a user's hand). Thus, the state machine 110 can determine various contextual states of the electronic device, based at least in part, on the input information 112b. Other examples of determining a contextual state of an electronic device based, at least in part, on sensor data are described in co-pending U.S. application Ser. No. 13/913,271, which is hereby incorporated by reference in its entirety.

In some cases, the state machine 110 can determine a contextual state based on an anticipated operating condition of the electronic device. For instance, in some cases, the state machine 110 can determine a contextual state by predicting the likelihood that the electronic device will be accessed by a user in the near feature. As an example, the state machine 110 can receive input information 112a indicating that a particular type of trigger event has occurred, and input information 112c indicating that the user has historically interacted with the device shortly after that particular type of trigger event has occurred. Based on this information, the state machine 110 can determine that the user is likely to interact with the electronic device in the near future. As another example, the state machine 110 can receive input information 112a indicating that another type of trigger event has occurred, and input information 112c indicating that the user has not historically interacted with the device when that other type of trigger event has occurred. Based on this information, the state machine 110 can determine that the user is unlikely to interact with the electronic device in the near future.

Although example combinations of inputs and contextual states are described above, these are merely examples to illustrate how an electronic device can utilize various inputs to contextually determine its operating state and the nature by which it is being used by a user. In practice, different combinations and sub-combinations of inputs and contextual states can be used in addition to or instead of those described above.

The sleep delay engine 120 adjusts the power state of the electronic device based, at least in part, on the contextual state 140 determined by the state machine 110. For example, in some cases, the sleep delay engine 120 can modify the operation of one or more modules 130 to modify the amount of power that is consumed by the electronic device. As shown in FIG. 1, in some cases, the sleep delay engine 120 can adjust the operation of a display module 130a, a processor module 130b, and a communications module 130c, among other components of the electronic device. The sleep delay engine 120 can also adjust the power state of the electronic device based on an input 122a indicating that amount of time that the electronic device has been inactive, one or more sleep delay values 122b, and/or settings 122c.

The sleep delay engine 120 determines the amount of time that the electronic device has been inactive (via input 122a), and adjusts the operations of one or more of the modules 130a-c if the amount of time has exceeded a particular sleep delay value. In some cases, the amount of time that the electronic device has been inactive can refer to an amount of time that has elapsed since the electronic device last received an activity from the user (e.g., the amount of time that has elapsed in which no inputs have been received via one or more buttons, switches, touch-sensitive screens, touch pads, or other input devices of the electronic device). In some cases, the amount of time that the electronic device has been inactive can refer to an amount of time that has elapsed since the electronic device entered the high power state.

As discussed above, the sleep delay value can be adaptively adjusted depending on the contextual state of the electronic device. For instance, in some cases, it may be beneficial to keep the device in a high power state (e.g., a "wake" state) for a longer period of time, even if the user has not interacted with the device (e.g., has not inputted any commands) for a period of time. As examples, this can include situations in which relatively important information is being displayed to the user, situations in which the user is actively using the device (even if he is not inputting commands), and situations in which the user is expected to interact with the device in the near future. Thus, in these situations, the sleep delay can be adaptively increased, such that the electronic device does not transition to a low power state (e.g., a "sleep" state) at a time that is inconvenient for the user.

However, in some cases, it may be beneficial to keep the device in a high power state for a shorter period of time. As examples, this can include situations in which relatively unimportant information is being displayed to the user, situations in which the user is not actively using the device, and situations in which the user is not expected to interact with the device in the near future. Thus, in these situations, the sleep delay can be adaptively decreased, such that the electronic device transitions more quickly to a low power state (e.g., a "sleep" state) to conserve power.

Thus, contextual states and their corresponding sleep delay values can be defined to balance user convenience and power efficiency in a variety of different operating conditions.

In general, the sleep delay engine 120 can determine the sleep delay value in a variety of ways. For example, in some cases, the sleep delay engine 120 can receive several sleep delay values 122b and can select a particular sleep delay value 122b based on the contextual state 140. In some cases, each contextual state 140 is associated with a particular sleep delay value 122b. Upon receipt of a particular contextual state 140 from the state machine 110, the sleep delay engine can select a particular sleep delay value 122b corresponding to the received contextual state. When the amount of time that the electronic device has been inactive 112a exceeds this selected sleep delay value 122b, the sleep delay engine 120 can change the power state of the electronic device by adjusting the operation of one or more modules 130a-c. As an example, the sleep delay engine 120 can disable portions of the display module 130a (e.g., by disabling a display screen, or dimming a backlight of the display screen). As another example, the sleep delay engine 120 can instruct the processor module 130b to reduce the visual effects that are applied when presenting information (e.g., by limiting or eliminating the use of blurring effects or animations). As another example, the sleep delay engine 120 can instruct the processor module 130b to operate according to a reduced capability mode (e.g., by reducing the clock speed of one or more processing units in the processor module 130b or by disabling one or more cores of the processing units). As yet another example, the sleep delay engine 120 can instruct the communications module 130c to reduce or eliminate the network connectivity of the electronic device, or disable or limit certain features of the communications module 130c (e.g., MIMO) in order to reduce power consumption.

To illustrate this concept, as a simplified example, the sleep delay engine 120 can receive two sleep delay values 112b (e.g., five seconds and ten seconds), each associated with a corresponding contextual state 140 of the electronic device (e.g., an "idle" state and an "in-use" state, respectively). Upon receipt of an "idle" contextual state 140 from the state machine 110, the sleep delay engine 120 determines that the corresponding sleep delay value is five seconds. Accordingly, when the interval of time that the electronic device has been inactive exceeds five seconds, the sleep delay engine 120 can adjust the operation of one or more of the modules 130a-c (e.g., by disabling the display screen of the electronic device) to conserve power. However, when the contextual state of the electronic device later changes (e.g., due to the user interacting with the electronic device differently), the sleep delay engine 120 receives an "in-use" contextual state 140 from the state machine 110 and determines that the new corresponding sleep delay value is ten seconds. Accordingly, when the interval of time that the electronic device has been inactive exceeds ten seconds, the sleep delay engine 120 can adjust the operation of one or more of the modules 130a-c (e.g., by disabling the display screen of the electronic device).

Although the above example describes the use of two example contextual states and two corresponding sleep delays, this is merely an illustrative example. In practice, any number of different contextual states and sleep delays can be used, depending on the implementation.

Further, although in the above example, the sleep delay engine 120 selects a particular sleep delay value from among several sleep delay values based on the contextual state 140, this need not be the case. For example, in some cases, the sleep delay engine 120 can determine a "base" sleep delay value, and can modify the base sleep delay value (e.g., increase or decrease the base sleep delay value by a modifier value) based on the contextual state 140. The base sleep delay value and/or the modifier values can be associated with particular contextual states 140 to obtain a particular sleep delay value for each contextual state of the electronic device.

To illustrate this concept, as a simplified example, the sleep delay engine 120 can receive a "base" sleep delay value (e.g., five seconds) and a "modifier" value (e.g., three seconds). Upon receipt of an "idle" contextual state 140 from the state machine 110, the sleep delay engine 120 determines that the sleep delay value is equal to the base value of five seconds. Accordingly, when the interval of time that the electronic device has been inactive exceeds five seconds, the sleep delay engine 120 can adjust the operation of one or more of the modules 130a-c (e.g., by disabling the display screen of the electronic device). However, when the contextual state of the electronic device later changes (e.g., due to the user interacting with the electronic device differently), the sleep delay engine 120 receives an in-use contextual state 140 from the state machine 110 and determines that the sleep delay value can be adjusted by the modifier value (e.g., increased by three seconds). Accordingly, when the amount of time that the electronic device has been inactive exceeds eight seconds, the sleep delay engine 120 can adjust the operation of one or more of the modules 130a-c (e.g., by disabling the display screen of the electronic device).

Although one base sleep delay value and one modifier value are described in the example above, in practice, the sleep delay engine 120 considers any number of base sleep delay values and modifier values to determine a sleep delay value for a particular contextual state. For example, in some cases, a sleep delay engine 120 can receive several modifier values, each associated with a particular contextual state. Accordingly, upon receipt of a particular contextual state, the sleep delay engine 120 can determine the sleep delay value by modifying the base value by the appropriate modifier value.

In some cases, the sleep delay value can be based, at least in part, on user settings 122c. For example, in some cases, a user can input preferences regarding one or more sleep delay values, and associate each of the inputted sleep values with particular contextual states of the electronic device. Accordingly, as the electronic device transitions between each of the contextual states, the sleep delay engine 120 selects one or more of the user inputted values to adaptively adjust the sleep delay of the electronic device. As another example, in some cases, a user can input settings describing a base sleep delay value. Accordingly, as the electronic device transitions between each of the contextual states, the sleep delay engine 120 obtains the base sleep delay value inputted by the user and modifies this value based on the contextual states of the electronic device to adaptively adjust the sleep delay. As yet another example, in some cases, the user can input particular modifier values and associate the entered values with one or more contextual states, such that the electronic device modifies the base value according to the user's inputted values.

Example Process

Figure 2:
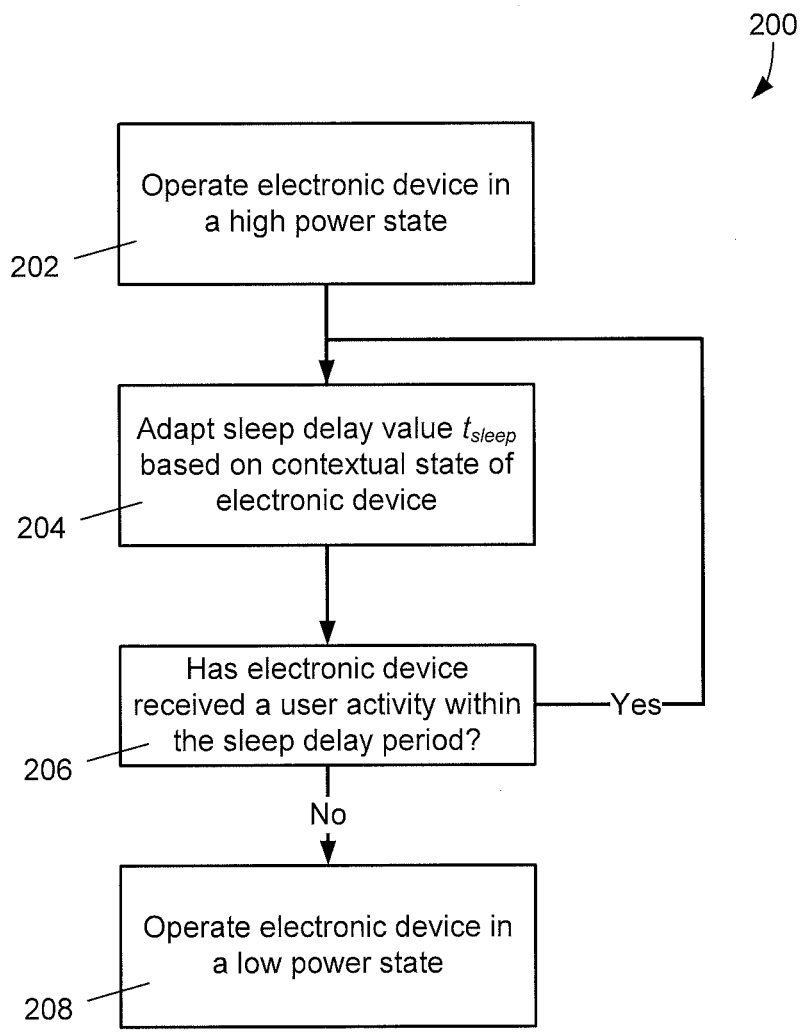
FIG. 2 is a flowchart of an example process for adjusting the sleep delay of an electronic device.

FIG. 2 is a flowchart of an example process 200 for adjusting the sleep delay of an electronic device. The process 200 can be implemented, for example, using the system 100 shown in FIG. 1.

In this example process, an electronic device is initially operated in a first (e.g., high power) state (step 202). As described above, in a high power state, the device can draw a relatively large amount of power and can provide a relatively broad range of functionality. In some cases, while in a high power state, an electronic device can enable a display device (e.g., a display screen), such that information is visually displayed to a user. In some cases, an electronic device can also visually present information using one or more visual effects (e.g., by blurring one or more visual elements using a blur filter, animating one or more visual elements, and so forth). In some cases, an electronic device can operate one or more processing units (e.g., CPUs, GPUs, or other processing units) in an increased capability mode (e.g., by operating those processing units according to a relatively high clock speed or by enabling one or more cores of the processing units). In some cases, an electronic device can also enable particular functions of the electronic device. For instance, an electronic device can activate network connectivity, such that the electronic device can transmit and receive data from a communications network. In some cases, an electronic device can also retrieve data from the network relatively frequently, or allow data to be pushed to it from a remote server.

The electronic device next adapts a sleep delay value $t_{sleep}$ based on the contextual state of the electronic device (step 204). As described above, the sleep delay value indicates an interval of time in which the electronic device awaits an activity, command, or input from the user before it transitions into a low power state (e.g., a sleep state).

In some cases, the contextual state of the electronic device can be determined using a state machine (e.g., the state machine 110 shown in FIG. 1). As described above, a state machine can determine the contextual state based on various combinations or sub-combinations of input information regarding the historical operating condition of the electronic device, the present operating condition of the electronic device (e.g., combinations or sub-combinations of the input information 112a-g shown in FIG. 1). As examples, the input information can include information pertaining to a trigger event that occurred while the electronic device was last in the low power state (e.g., a trigger event that caused the electronic device to transition to the high power state), a motion state of the electronic device, an orientation of the electronic device, a state of a battery of the electronic device, a state of an application running on the electronic device, a security state of the electronic device, and/or a security state of the electronic device, among others.

As described above, the sleep delay value $t_{sleep}$ can be adapted based on the contextual state of the electronic device. For example, as described above, the sleep delay value $t_{sleep}$ can be adapted by obtaining a default time value (e.g., a base sleep delay value), and determining the contextual state of the electronic device. The base sleep delay value can then be modified based on the determined contextual state of the electronic device (e.g., by increasing or decreasing the base sleep delay value by a particular modifier value associated with the contextual state).

As another example, as also described above, the sleep delay value $t_{sleep}$ can be adapted by obtaining one or more time values, each associated with a respective contextual state of the electronic device. The sleep delay value $t_{sleep}$ can be set equal to the particular time value associated with the current contextual state of the electronic device.

The electronic device next determines if it has received a user activity within the sleep delay period defined by the sleep delay value $t_{sleep}$ (step 206). In some cases, the electronic device can start a timer that tracks the amount of time that has elapsed since a command or input was last received from a user and/or the amount of time that has elapsed since the device entered the high power state. If this amount of time exceeds the sleep delay value $t_{sleep}$, the electronic device determines that no user activity was received within the sleep delay period. If this amount of time does not exceed the sleep delay value $t_{sleep}$, the electronic device determines that user activity was received within the sleep delay period. This determination can be performed continuously or substantially continuously, periodically (e.g., once every 1 second, two seconds, three seconds, or any other period of time), or according to any other pattern.

If the electronic device has received a user activity within the sleep delay period, the electronic device remains operating in the high power state. For example, the electronic device can continue to enable the display device, continue to visually present information using one or more visual effects, continue to operate one or more processing units in an increased capability mode, and/or continue to enable particular functions of the electronic device.

If the electronic device has not received a user input within the sleep delay period, the electronic device transitions to a low power state (step 208). As described above, while operating in a low power state, the electronic device can adjust operation of one or more of its components to conserve power. In some cases, in transitioning to a low power state, an electronic device can reduce the brightness of a display screen (e.g., by reducing the brightness of a backlight) or disable the display screen entirely, such that information is no longer visually displayed to a user. In some cases, an electronic device can reduce the visual effects that are applied when presenting information (e.g., by limiting or eliminating the use of blurring effects or animations). In some cases, an electronic device can operate one or more processing units according to a reduced capability mode (e.g., by operating those processing units according to a reduced clock speed or by disabling one or more cores of the processing units). In some cases, an electronic device can also reduce, or in some cases disable, particular functions of the electronic device. For instance, an electronic device can retrieve data from a network relatively infrequently, or prevent data from being pushed to it from a remote server. In some cases, an electronic device can change the operation of a communications module (e.g., a cellular radio, Wi-Fi radio, or other wireless radio) to consume less power. For instance, an electronic device can instruct a cellular radio to disable or limit certain features, such as multiple-input and multiple-output (MIMO) functions. In some cases, an electronic device can disable its network connectivity entirely, such that the device cannot transmit and receive data from the communications network. In some cases, an electronic device can perform a single power saving operation (e.g., disable a display screen) or perform multiple power saving operations (e.g., disable a display screen and operate its processing units according to a reduce clock speed).

As the sleep delay value $t_{sleep}$ is adaptively adjusted based on the contextual state of the electronic device, the electronic device can adjust its power consumption in response to the operating condition of the electronic device. Thus, the electronic device can draw power more efficiently. Further, as the sleep delay value $t_{sleep}$ is adaptively adjusted, the electronic device is less likely to transition between a high power state into a low power state while the device is being used by a user. Thus, the likelihood that a user will be inconvenienced will be reduced.

Example State Machine

Figure 3:
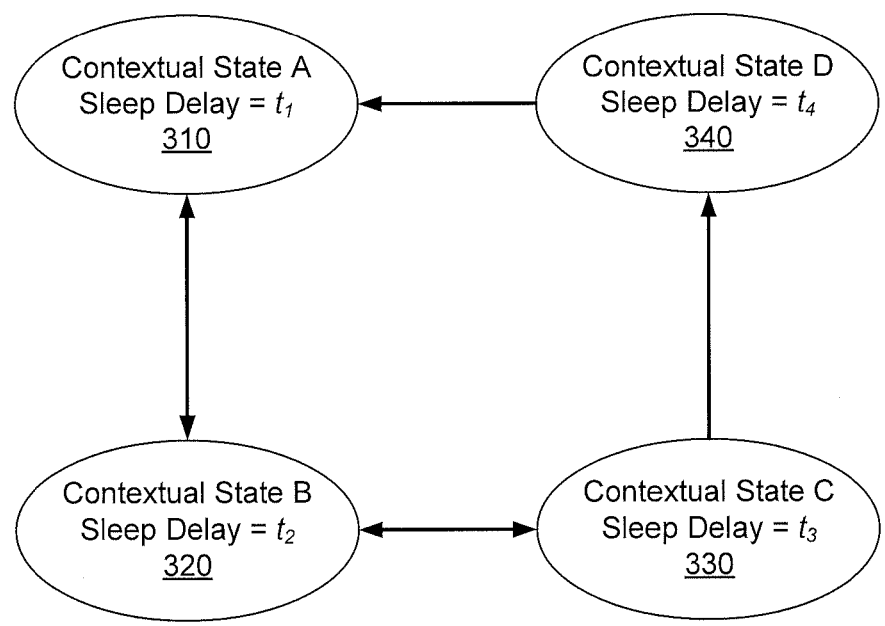
FIG. 3 is a diagram of an example state machine for determining the contextual state of an electronic device.

FIG. 3 illustrates an example state machine 300 for determining the contextual state of an electronic device based on various input information. For instance, the state machine 300 can determine a contextual state of an electronic device based on some or all of the input information 112a-g as described with respect to FIG. 1.

The state machine 300 initially determines that the electronic device is in a particular initial state (e.g., when the electronic device is powered on, or when the state machine is initialized). As an example, referring to FIG. 3, the state machine 300 can initially determine that the electronic device is in a contextual state A (310). As described above, the sleep delay of the electronic device can be adapted based on its contextual state. For example, while the electronic device is in the contextual state A (310), the sleep delay of the electronic device can be set to a first sleep delay value $t_1$.

The state machine 300 can determine that the electronic device has transitioned to another contextual state based on input information (e.g., device based on some or all of the input information 112a-g). As an example, referring to FIG. 3, the state machine 300 can determine, based on input information, that the electronic device has transitioned to a second contextual state B (320). As described above, the sleep delay of the electronic device can be adapted based on the change to its contextual state. For example, while the electronic device is in the contextual state B (320), the sleep delay of the electronic device can be set to a second sleep delay value $t_2$.

In some cases, an electronic device can transition back and forth between certain contextual states. For example, referring to FIG. 3, the electronic device can transition back and forth between the contextual state A (310) and the contextual state B (320), and back and forth between the contextual state B (320) and the contextual state C (330). However, in this example, the electronic device cannot directly transition between the contextual state A (310) and the contextual state C (330), and must first transition to the contextual state B (320) in order to do so. As described, the sleep delay of the electronic device can be adapted based on changes to its contextual state. For example, while the electronic device is in the contextual state C (330), the sleep delay of the electronic device can be set to a third sleep delay value $t_3$.

In some cases, an electronic device can transition from one contextual state to another, but cannot directly transition back to the original contextual state. For example, referring to FIG. 3, the electronic device can transition from the contextual state C (330) to the contextual state D (340), but cannot directly transition from the contextual state D (340) back to the contextual state C (330). Likewise, the electronic device can transition from the contextual state D (340) to the contextual state A (310), but cannot directly transition from the contextual state A (310) back to the contextual state D (340). As described above, the sleep delay of the electronic device can be adapted based on changes to its contextual state. For example, while the electronic device is in the contextual state D (340), the sleep delay of the electronic device can be set to a fourth sleep delay value $t_4$. In this manner, a state machine can determine the contextual state of an electronic device as it transitions between two or more different contextual states. Correspondingly, the sleep delay of the electronic device can be adapted based on the determined contextual state.

In general, some or all of the sleep delay values associated with the contextual states can differ from each other. For example, referring to FIG. 3, in some cases, sleep delay values $t_1$, $t_2$, $t_3$, and $t_4$ can each be different values. As another example, in some cases, some sleep delay values (e.g., $t_1$ and $t_3$) can be the same value, while other sleep delay values (e.g., $t_2$ and $t_4$) can be different values. As yet another example, in some cases, one or more sleep delay values can be infinite or substantially infinite, indicating that the electronic device will not enter transition to a low power state while in that contextual state.

Although an example state machine 300 is illustrated in FIG. 3, this is merely an illustrative example. In practice, a state machine can include any number of contextual states, depending on the implementation. Similarly, a state machine can allow for different transitions (e.g., one way or two way transitions) between any two states, or can prevent transitions between any two states, depending on the implementation.

In some cases, an electronic device can simultaneously occupy multiple different contextual states, and the sleep delay of the electronic device can be adapted based on the combination of these contextual states. To illustrate the foregoing, Table I is example contextual state table for three contextual states: Lock Screen, Notifications and Device In Hand. The electronic device is in the Lock Screen contextual state when the electronic device has engaged a security lock (e.g., a lock screen) that restricts access to the electronic device. The electronic device is in the Notifications contextual state when the electronic device is displaying a notification to a user. The electronic device is in the Device In Hand contextual state when the electronic device is in a user's hand.

TABLE I

Contextual State Table

| Lock Screen | Notifications | Device In Hand | Sleep Delay (secs) |
| --- | --- | --- | --- |
| NO | NO | NO | 5 |
| NO | YES | NO | 10 |
| YES | NO | NO | 5 |
| YES | YES | NO | 10 |
| NO | NO | YES | 5 |
| NO | YES | YES | 120 |
| YES | NO | YES | 30 |
| YES | YES | YES | 60 |

As can be observed from Table I, based on the three contextual states (Lock Screen, Notifications, Device In Hand), the sleep delay is increased or decreased. For example, when the screen is unlocked, there are notifications displayed on the screen and the device is in the user's hand, the sleep delay is increased to 2 minutes, under the assumption that the user is actively interacting with the device and would like more time to review notifications. By contrast, when the screen is locked, there are no notifications displayed above the lock screen and the device is not in the user's hand, the sleep delay is decreased to 5 seconds, under the assumption that the user is not actively interacting with the device and there is an opportunity to conserve power that would not interrupt use of the device. Likewise, other combinations of contextual states can result in different sleep delays. Although example combinations of contextual states and sleep delays are shown in Table I, these are merely illustrative examples. In practice, other combinations of contextual states and sleep delays can be used, depending on the implementation.

Example System Architecture

Figure 4:
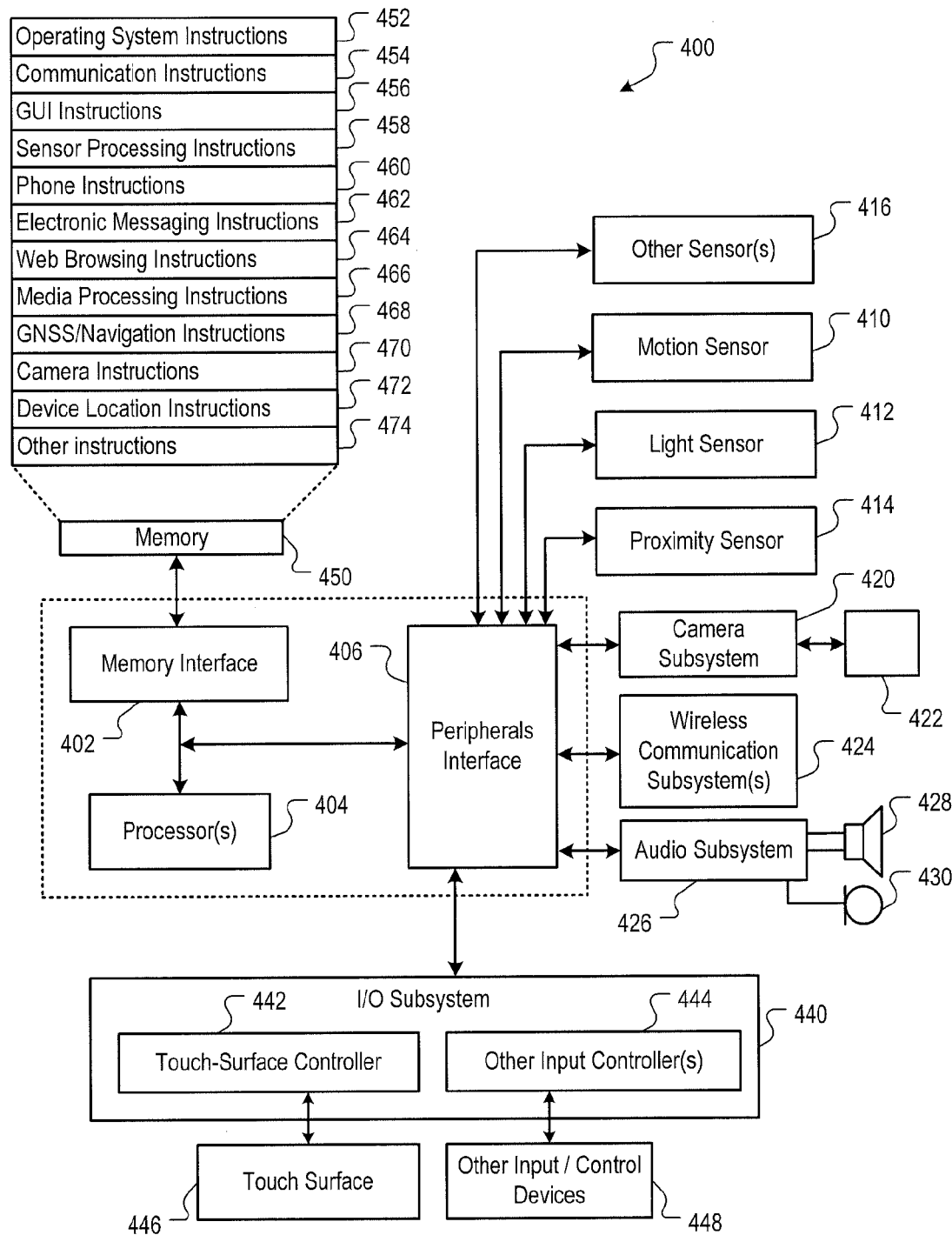
FIG. 4 is a diagram of an example of an electronic device for performing the process of FIG. 2

FIG. 4 is a block diagram of an example of a computing device 400 that can implement the features and processes of FIGS. 1-3. As an example, computing device 400 can be used to implement system 100 of FIG. 1 and state machine 300 of FIG. 3, and perform implementations of process 200 of FIG. 2. In some cases, the computing device 400 can be an electronic device, as described herein. The computing device 400 can include a memory interface 402, one or more data processors, image processors and/or central processing units 404, and a peripherals interface 406. The memory interface 402, the one or more processors 404 and/or the peripherals interface 406 can be separate components or can be integrated in one or more integrated circuits. The various components in the computing device 400 can be coupled by one or more communication buses or signal lines.

Sensors, devices, and subsystems can be coupled to the peripherals interface 406 to facilitate multiple functionalities. For example, a motion sensor 410, a light sensor 412, and a proximity sensor 414 can be coupled to the peripherals interface 406 to facilitate orientation, lighting, and proximity functions. Other sensors 416 can also be connected to the peripherals interface 406, such as a global navigation satellite system (GNSS) (e.g., GPS receiver), a temperature sensor, a biometric sensor, barometric pressure sensor, magnetometer or other sensing device, to facilitate related functionalities.

A camera subsystem 420 and an optical sensor 422, e.g., a charged coupled device (CCD) or a complementary metal-oxide semiconductor (CMOS) optical sensor, can be utilized to facilitate camera functions, such as recording photographs and video clips. The camera subsystem 420 and the optical sensor 422 can be used to collect images of a user to be used during authentication of a user, e.g., by performing facial recognition analysis.

Communication functions can be facilitated through one or more wireless communication subsystems 424, which can include radio frequency receivers and transmitters and/or optical (e.g., infrared) receivers and transmitters. The specific design and implementation of the communication subsystem 424 can depend on the communication network(s) over which the computing device 400 is intended to operate. For example, the computing device 400 can include communication subsystems 424 designed to operate over a GSM network, a GPRS network, an EDGE network, a Wi-Fi or WiMax network, and a Bluetooth™ network. In particular, the wireless communication subsystems 424 can include hosting protocols such that the device 400 can be configured as a base station for other wireless devices.

An audio subsystem 426 can be coupled to a speaker 428 and a microphone 430 to facilitate voice-enabled functions, such as speaker recognition, voice replication, digital recording, and telephony functions. The audio subsystem 426 can be configured to facilitate processing voice commands, voice printing and voice authentication, for example.

The I/O subsystem 440 can include a touch-surface controller 442 and/or other input controller(s) 444. The touch-surface controller 442 can be coupled to a touch surface 446. The touch surface 446 and touch-surface controller 442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 446.

The other input controller(s) 444 can be coupled to other input/control devices 448, such as one or more buttons, rocker switches, thumb-wheel, infrared port, USB port, and/or a pointer device such as a stylus. The one or more buttons (not shown) can include an up/down button for volume control of the speaker 428 and/or the microphone 430.

In one implementation, a pressing of the button for a first duration can disengage a lock of the touch surface 446; and a pressing of the button for a second duration that is longer than the first duration can turn power to the computing device 400 on or off. Pressing the button for a third duration can activate a voice control, or voice command module that enables the user to speak commands into the microphone 430 to cause the device to execute the spoken command. The user can customize a functionality of one or more of the buttons. The touch surface 446 can, for example, also be used to implement virtual or soft buttons and/or a keyboard.

In some implementations, the computing device 400 can present recorded audio and/or video files, such as MP3, AAC, and MPEG files. In some implementations, the computing device 400 can include the functionality of an MP3 player, such as an iPod™. The computing device 400 can, therefore, include a 36-pin connector that is compatible with the iPod. Other input/output and control devices can also be used.

The memory interface 402 can be coupled to memory 450. The memory 450 can include high-speed random access memory and/or non-volatile memory, such as one or more magnetic disk storage devices, one or more optical storage devices, and/or flash memory (e.g., NAND, NOR). The memory 450 can store an operating system 452, such as Darwin, RTXC, LINUX, UNIX, OS X, WINDOWS, or an embedded operating system such as VxWorks.

The operating system 452 can include instructions for handling basic system services and for performing hardware dependent tasks. In some implementations, the operating system 452 can be a kernel (e.g., UNIX kernel). In some implementations, the operating system 452 can include instructions for determining whether the electronic device is on a user's body or on a stationary object and adjusting the transmit power of the electronic device accordingly. For example, operating system 452 can implement the sleep delay adjustment features as described with reference to FIGS. 1-2.

The memory 450 can also store communication instructions 454 to facilitate communicating with one or more additional devices, one or more computers and/or one or more servers. The memory 450 can include graphical user interface instructions 456 to facilitate graphic user interface processing; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GNSS/Navigation instructions 468 to facilitate GNSS and navigation-related processes and instructions; and/or camera instructions 470 to facilitate camera-related processes and functions. The memory 450 can store software instructions 472 to facilitate other processes and functions, the sleep delay adjustment processes and functions as described with reference to FIGS. 1-3.

The memory 450 can also store other software instructions 474, such as web video instructions to facilitate web video-related processes and functions; and/or web shopping instructions to facilitate web shopping-related processes and functions. In some implementations, the media processing instructions 466 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 450 can include additional instructions or fewer instructions. Furthermore, various functions of the computing device 400 can be implemented in hardware and/or in software, including in one or more signal processing and/or application specific integrated circuits.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   determining, by an electronic device, that the electronic device has not received a user activity for an interval of time;

determining, by the electronic device, a contextual state of the electronic device, wherein the contextual state of the electronic device is determined, at least in part, by determining whether the electronic device has engaged a security lock restricting access to the electronic device;

modifying, by the electronic device, a sleep delay value based on the determined contextual state of the electronic device;

determining that the interval of time has exceeded the sleep delay value; and responsive to determining that the interval of time has exceeded the sleep delay value, transitioning, by the electronic device, from a first power state to a second power state, where the first power state is higher or lower than the second power state.

2. The method of claim 1, wherein modifying the sleep delay value comprises:
obtaining a default time value; and
modifying the default time value based on the contextual state of the electronic device.

3. The method of claim 2, wherein modifying the default time value comprises:
determining a modifier value associated with the contextual state of the electronic device; and
modifying the default time value by the modifier value.

4. The method of claim 1, wherein modifying the sleep delay value comprises:
determining a time value associated with the contextual state of the electronic device; and
determining that the sleep delay value is equal to the time value associated with the contextual state of the electronic device.

5. The method of claim 1, wherein the contextual state of the electronic device corresponds, at least in part, to a trigger event that occurred while the electronic device was last in the low power state.

6. The method of claim 1, wherein the contextual state of the electronic device corresponds, at least in part, to a motion state of the electronic device.

7. The method of claim 1, wherein the contextual state of the electronic device corresponds, at least in part, to an orientation of the electronic device.

8. The method of claim 1, wherein the contextual state of the electronic device corresponds, at least in part, to a state of a battery of the electronic device.

9. The method of claim 1, wherein the contextual state of the electronic device corresponds, at least in part, to a state of an application running on the electronic device.

10. The method of claim 1, wherein the contextual state of the electronic device corresponds, at least in part, to a state of a network connection of the electronic device.

11. The method of claim 1, wherein the contextual state of the electronic device corresponds, at least in part, to a security state of the electronic device.

12. The method of claim 1, wherein the contextual state of the electronic device corresponds, at least in part, to recent user behavior detected by the electronic device.

13. The method of claim 1, wherein transitioning from the first power state to the second power state comprises shutting off a display device of the electronic device.

14. The method of claim 1, wherein transitioning from the first power state to the second power state comprises reducing a processing capability of a processor of the electronic device.

15. A non-transitory computer-readable medium including one or more sequences of instructions which, when executed by one or more processors, causes:
determining, by an electronic device, that the electronic device has not received a user activity for an interval of time;

determining, by the electronic device, a contextual state of the electronic device, wherein the contextual state of the electronic device is determined, at least in part, by determining whether the electronic device has engaged a security lock restricting access to the electronic device;

modifying, by the electronic device, a sleep delay value based on the determined contextual state of the electronic device;

determining that the interval of time has exceeded the sleep delay value; and responsive to determining that the interval of time has exceeded the sleep delay value, transitioning, by the electronic device, from a first power state to a second power state, where the first power state is higher or lower than the second power state.

16. The non-transitory computer-readable medium of claim 15, wherein modifying the sleep delay value comprises:
obtaining a default time value; and
modifying the default time value based on the contextual state of the electronic device.

17. The non-transitory computer-readable medium of claim 16, wherein modifying the default time value comprises:
determining a modifier value associated with the contextual state of the electronic device; and
modifying the default time value by the modifier value.

18. The non-transitory computer-readable medium of claim 15, wherein modifying the sleep delay value comprises:
determining a time value associated with the contextual state of the electronic device; and
determining that the sleep delay value is equal to the time value associated with the contextual state of the electronic device.

19. The non-transitory computer-readable medium of claim 15, wherein the contextual state of the electronic device corresponds to a trigger event that occurred while the electronic device was last in the low power state.

20. The non-transitory computer-readable medium of claim 15, wherein the contextual state of the electronic device corresponds, at least in part, to a motion state of the electronic device.

21. The non-transitory computer-readable medium of claim 15, wherein the contextual state of the electronic device corresponds, at least in part, to an orientation of the electronic device.

22. The non-transitory computer-readable medium of claim 15, wherein the contextual state of the electronic device corresponds, at least in part, to a state of a battery of the electronic device.

23. The non-transitory computer-readable medium of claim 15, wherein the contextual state of the electronic device corresponds, at least in part, to a state of an application running on the electronic device.

24. The non-transitory computer-readable medium of claim 15, wherein the contextual state of the electronic device corresponds, at least in part, to a state of a network connection of the electronic device.

25. The non-transitory computer-readable medium of claim 15, wherein the contextual state of the electronic device corresponds, at least in part, to a security state of the electronic device.

26. The non-transitory computer-readable medium of claim 15, wherein the contextual state of the electronic device corresponds, at least in part, to recent user behavior detected by the electronic device.

27. The non-transitory computer-readable medium of claim 15, wherein transitioning from the first power state to the second power state comprises shutting off a display device of the electronic device.

28. The non-transitory computer-readable medium of claim 15, wherein transitioning from the first power state to the second power state comprises reducing a processing capability of a processor of the electronic device.

29. A system comprising:
one or more processors; and
a non-transitory computer-readable medium including one or more sequences of instructions which, when executed by the one or more processes, causes:
determining, by an electronic device, that the electronic device has not received a user activity for an interval of time;
determining, by the electronic device, a contextual state of the electronic device, wherein the contextual state of the electronic device is determined, at least in part, by determining whether the electronic device has engaged a security lock restricting access to the electronic device;
modifying, by the electronic device, a sleep delay value based on the determined contextual state of the electronic device;
determining that the interval of time has exceeded the sleep delay value; and
responsive to determining that the interval of time has exceeded the sleep delay value, transitioning, by the electronic device, from a first power state to a second power state, where the first power state is higher or lower than the second power state.

30. The system of claim 29, wherein modifying the sleep delay value comprises:
obtaining a default time value; and
modifying the default time value based on the contextual state of the electronic device.

31. The system of claim 30, wherein modifying the default time value comprises:
determining a modifier value associated with the contextual state of the electronic device; and
modifying the default time value by the modifier value.

32. The system of claim 29, wherein modifying the sleep delay value comprises:
determining a time value associated with the contextual state of the electronic device; and
determining that the sleep delay value is equal to the time value associated with the contextual state of the electronic device.

33. The system of claim 29 wherein the contextual state of the electronic device corresponds to a trigger event that occurred while the electronic device was last in the low power state.

34. The system of claim 29, wherein the contextual state of the electronic device corresponds, at least in part, to a motion state of the electronic device.

35. The system of claim 29, wherein the contextual state of the electronic device corresponds, at least in part, to an orientation of the electronic device.

36. The system of claim 29, wherein the contextual state of the electronic device corresponds, at least in part, to a state of a battery of the electronic device.

37. The system of claim 29, wherein the contextual state of the electronic device corresponds, at least in part, to a state of an application running on the electronic device.

38. The system of claim 29, wherein the contextual state of the electronic device corresponds, at least in part, to a state of a network connection of the electronic device.

39. The system of claim 29, wherein the contextual state of the electronic device corresponds, at least in part, to a security state of the electronic device.

40. The system of claim 29, wherein the contextual state of the electronic device corresponds, at least in part, to recent user behavior detected by the electronic device.

41. The system of claim 29, wherein transitioning from the first power state to the second power state comprises shutting off a display device of the electronic device.

42. The system of claim 29, wherein transitioning from the first power state to the second power state comprises reducing a processing capability of a processor of the electronic device.

43. The method of claim 1, wherein the contextual state of the electronic device is further determined, at least in part, by determining whether the electronic device is displaying a notification.

44. The method of claim 43, wherein the contextual state of the electronic device is further determined, at least in part, by determining whether the electronic device is in a user's hand.

* * * * *